United States Patent Office 3,242,217
Patented Mar. 22, 1966

3,242,217
ORGANIC PHOSPHORUS COMPOUNDS
William C. Hammann and Rodney B. Clampitt, St. Louis, Mo., assignors to Monsanto Research Corporation, St. Louis, Mo., a corporation of Delaware
No Drawing. Filed May 15, 1963, Ser. No. 280,708
2 Claims. (Cl. 260—606.5)

This invention relates to organic phosphorus compounds and more particularly provides a method of preparing substantially pure phosphinylidynetrimethanol and certain trialkanoates obtained from said phosphinylidynetrimethanol.

In prior art, phosphinylidynetrimethanol tribenzoate (A. Hoffman, J. Amer. Chem. Soc., 43 1684 (1921) and 52 2995 (1930)) and trilaurate (D. F. Houston, ibid, 68 914 (1946)) have been prepared from tetrakis(hydroxymethyl)phosphonium chloride by intermediate conversion of the latter to phosphinylidynetrimethanol and esterification of the latter, according to the following schemes when benzoyl chloride is used:

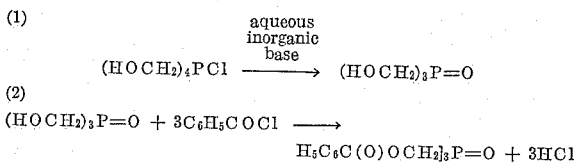

(2)
$(HOCH_2)_3P=O + 3C_6H_5COCl \longrightarrow$
$[H_5C_6C(O)OCH_2]_3P=O + 3HCl$ In order to assure complete conversion of the phosphonium chloride in (1), an excess of base was used, and in order to facilitate removal of the by-product chloride and of the excess base, the latter was one in which the cation could be combined to give a water-insoluble salt. Hence, an alkali or alkaline earth metal hydroxide or carbonate was generally employed in step (1), the barium compounds being preferred because the by-product barium chloride and/or any excess barium salt could be removed by conversion, through sulfuric acid treatment, to the water-insoluble barium sulfate. After filtering off the sulfate, the residue was evaporated or distilled to give the phosphinylidynetrimethanol used for esterification. Although, in theory, the above-summarized process should lead to give good yields of any phosphinylidynetrimethanol esters, in practice the process has not been shown to be feasible for preparing alkanoates in which the alkanoate radical has from 2 to 5 carbon atoms. Such esters of phosphinylidynetrimethanol will be hereinafter referred to as the lower alkanoates.

A process involving alkali treatment of tetrakis(hydroxymethyl)phosphonium chloride and subsequent removal of by-product by treatment with a precipitant for the by-product may well involve diversion of at least a part of the starting phosphonium chloride to a phosphorus compound which is other than phosphinylidynetrimethanol; and, in fact, we have found by $P^{31}$ nuclear magnetic resonance studies that the product so obtained is a mixture, rather than a single compound. Said mixture is a very impure phosphinylidynetrimethanol. Whether or not such a mixture can be used for the preparation of phosphinylidynetrimethanol triesters depends, to some extent, on the reactivity of the acidic esterifying component. Although the more sluggish higher alkanoic acids or the aromatic acids or their acyl halides react with the impure trimethanol to give the corresponding triesters, when said impure trimethanol is reacted with the lower alkanoic acids, their acyl halides or anhydrides, there is obtained as product a mixture of numerous close-boiling materials, and the trialkanoate can be recovered, if at all, in only very low yield. Thus, when crude phosphinylidynetrimethanol (obtained by refluxing tetrakis(hydroxymethyl)phosphonium chloride with barium carbonate, removing barium as barium sulfate, and evaporating the resulting solution under reduced pressure) was treated with acetic anhydride, the product obtained after distillation was shown by nuclear magnetic resonance to contain several phosphorus compounds. Repeated distillation failed to give phosphinylidynetrimethanol triacetate in any substantial yield.

That failure to obtain lower alkanoates of phosphinylidynetrimethanol may stem from a peculiar reactivity of the lower alkanoic acidic reactant with the impurities present in the crude trimethanol compound and/or from the effect of such impurities on a possibly intermediately formed phosphinylidynetrimethanol lower trialkanoate, may be surmised from the fact that crude trimethanol compound which could not be converted to the triacetate, can be used to make either the tribenzoate or the trilaurate. The lower trialkanoates can then be prepared by first preparing the tribenzoate or trilaurate, hydrolyzing it to the phosphinylidynetrimethanol, and then esterifying the latter with a lower alkanoic acid, acyl halide or acid anhydride. Thereby there is obtained, e.g., with acetyl chloride, a well-characterized, crystalline phosphinylidynetrimethanol triacetate.

To obtain the lower trialkanoates by first preparing the tribenzoate or a higher alkanoate is not only tedious but costly in materials expenditure. Accordingly, an object of the invention is to provide an improved process for preparing a grade of phosphinylidynetrimethanol which is substantially free of the impurities that hinder its conversion to the lower trialkanoates. Another object is the preparation of said trialkanoates from phosphinylidynetrimethanol and a lower alkanoic acid, or its acyl halide or anhydride. Still another object is the provision of a process whereby said alkanoates are obtained by employing the readily available tetrakis(hydroxymethyl)phosphonium halide as starting material and without proceeding through the benzoate. A further object is the provision of a method for obtaining phosphinylidynetrimethanol having a high degree of purity. A very important objective is provision of the new and valuable phosphinylidynetrimethanol alkanoates having from 2 to 5 carbon atoms in the alkanoate portion of the molecule.

These and other objects hereinafter disclosed are provided by the invention wherein the reaction product of a tetrakis(hydroxymethyl)phosphonium halide and aqueous inorganic base is deionized by contacting it with a cation exchange resin for removal of cationic by-product and with anion exchange resin for removal of anionic by-product. The resulting deionized phosphinylidynetrimethanol is then capable of reaction with an esterifying lower alkanoic acid compound to give phosphinylidynetrimethanol trialkanoate. Although treatment with both types of resin is desirable, instead of the cationic resin treatment, the cationic by-product may be removed by precipitation. Thus when the inorganic base is an alkaline earth metal carbonate, e.g., barium carbonate, the following reactions may take place:

(1) $2(HOCH_2)_4PCl + 2BaCO_3 + H_2O \rightarrow$
$2(HOCH_2)_3P=O + 2HCHO + 2H_2 + BaCl_2 + BaCO_3$
(2) $BaCl_2 + BaCO_3 + 2H_2SO_4 \rightarrow$
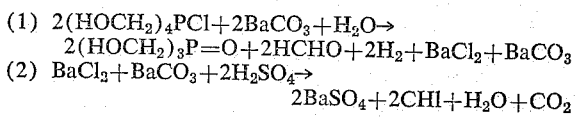

Subsequent to treatment with a sulfuric acid, the reaction mixture thus consists of phosphinylidynetrimethanol, barium sulfate, hydrogen chloride, water, and possibly small amounts of formaldehyde, hydrogen and carbon dioxide. The barium sulfate is removed by filtration and the anion impurities still present in the residue are removed, very advantageously, according to this invention, by treatment with anion exchange resin. When only volatilization is used, the phosphinylidynetrimethanol is not sufficiently pure to give any substantial amount of lower trialkanoate.

As cation exchange resins there may be employed the nuclear sulfonic styrene base resins such as those which are available in commerce as Amberlite IR–120, Dowex 50, Chempro C–20, Permutit Q, or Zeo Karb 225 or the carboxylic acrylic polymers such as the commercially available Amberlite IRC–50 or Zeo-Karb 226, or the sulfonated phenolic resins such as Amberlite IR–1 or Dowex 30. Useful anion exchange resins are the quaternary ammonium polystyrenes such as Amberlite IRA–400, 401 and 410, Dowex 1 and 2, Duolite A–101 and 102, Permutit S–1 and S–2 and the weakly basic aminated polystyrenes and styrenedivinylbenzene copolymers or the aminated phenolic resins such as Amberlite IR–45 and IR–4B, Dowex 3 and Duolite A–114. Ion exchange resins are well-known in the trade and further examples thereof will be found in the book "Ion Exchange Technology," edited by F. C. Nachod et al., N.Y., Academic Press, 1956; in the book "Ion Exchange Resins" by R. Kunin, N.Y., John Wiley and Sons, 1958; and in the book "Synthetic Ion-Exchangers" by G. H. Osborn, N.Y., Macmillan, 1956. Generally, the cation exchange resins disclosed therein are useful for removing the cation content, e.g., the alkali or alkaline earth metal ions from the crude phosphinylidynetrimethanol and the anion exchange resins shown therein are useful for removing the anion content, e.g., halogen and sulfate ions, of said crude product.

Treatment with the ion exchange resin may be conducted by passing the solution of the crude phosphinylidynetrimethanol through a membrane of the resin or by mixing pearls or beads or other particles of the resin with said solution, the quantity of ion exchange resin being calculated to be at least enough to provide exchange sites for removal of the ion content of the crude material. Instead of employing a cation exchange resin for removing the alkali or alkaline earth metal ion, the latter may be removed by precipitation, e.g., by addition of sulfuric acid to form insoluble sulfate. Generally, the filtrate obtained from the precipitated salt, e.g., barium sulfate, contains enough water to give an easily manipulated solution. However, additional water may be added in order to facilitate subsequent treatment with anion exchange resin. Also, if desired, the filtrate may be evaporated for removal of low boiling impurities prior to treatment with resin. However, although evaporation is effective to remove some impurties, it does not render the phosphinylidynetrimethanol sufficiently pure for use in preparing the lower alkanoates thereof. Treatment with anion resin is required. Obviously, if the filtrate is evaporated to dryness, the dried residue will have to be mixed with water previous to treatment with the ion-exchange resin.

The resin treatment is generally conducted at ambient temperatures and ordinary atmospheric pressures; but increased temperatures and pressures may be used. Usually the impurities which are present in the crude phosphenylidynetrimethanol are soluble in water at ordinary room temperature and pressure; however, if there has been employed during preparation of the crude material, starting from tetrakis(hydroxymethyl)phosphonium halide, a material which is known to be water-soluble only with heating, the temperature of the aqueous crude product may be accordingly increased. Digestion with particulated ion-exchange resin may then be employed. In the usual preparative procedure, wherein alkali or alkaline earth metal hydroxides or salts are encountered, the purifying treatment may be effected by simply passing the aqueous crude product, subsequent to filtering off precipitated solids, through a membrane of the ion exchange resin at ordinary room temperature and pressure, and usually one such treatment is sufficient. Mixing said aqueous crude product with the particulated resin also effects deionization within a short period of time.

After the deionizing treatment, water may or may not be removed from the purified solution prior to esterification. This will depend upon the nature of the acidic reactant which is to be used; i.e., when an acyl halide is used, substantial absence of water is more important than when the free acid is used. Esterification is conducted in the presence or absence of an acidic or basic esterifying catalyst, e.g., p-toluenesulfonic acid, a mineral acid such as hydrochloric acid, a nitrogenous base such as pyridine, and alkali metal alkoxide such as sodium methoxide, etc., and in the presence or absence of an inert solvent or diluent. Advantageously, an excess of the acidic reactant may serve as diluent. Extraneous, liquid, inert, solvents or diluents which may be employed include, e.g., the lower aliphatic ethers and ketones such as ethyl ether and 2-butanone, aliphatic hydrocarbons or halogen-substituted hydrocarbon such as hexane, dodecane, carbon tetrachloride or ethylene dichloride, heterocyclic nitrogen bases or ethers such as pyridine, morpholine or dioxane, the lower alkylamides such as dimethylacetamide, etc.

Since formation of the presently provided phosphinylidynetrimethanol trialkanoates occurs by reaction of one mole of the trimethanol with three moles of the carboxylic component, these reactants are advantageously employed in such stoichiometric proportions; however, an excess of the carboxylic reactant may be used. Such excess is frequently advantageous, since it not only can serve as diluent but it also assures complete reaction of the phosphorus reactant. Any excess of the acidic compound is readily recovered from the resulting reaction mixture, e.g., by distillation, solvent extraction, etc. The temperature at which esterification is conducted will vary, of course, with the nature of the acidic reactant. When employing the acyl halide or acid anhydride, the reaction many be initially somewhat exothermic. After exothermic reaction has subsided, heating at a temperature of from, say, 50° C. to reflux may be used to assure complete reaction within as short a time as possible. Also, in order to obtain smooth reaction, cooling may be employed when exothermic reaction is evidenced. When using the free acid as the acidic reactant, exothermic reaction is not usual, and the esterification is generally conducted at the refluxing temperature of the reaction mixture, though gentle heating, say, at temperatures of 50° C. and below the refluxing temperature, may be used. The esterification is conveniently conducted by employing apparatus which makes provision for removal of water, e.g., using a condenser equipped with a Dean-Stark trap; and in the choice of solvent, the removal of by-product water may be a consideration sufficient to select one which forms an azeotrope with water.

As hereinbefore stated, the acidic component may be the lower alkanoic acid, its acyl halide or anhydride or mixture thereof. Examples of such acidic materials are, e.g., glacial acetic acid, acetyl chloride, fluoride, bromide or iodide, acetic anhydride, propionic acid, propionyl chloride or bromide, propionic anhydride, butyric or isobutyric acid, butyryl or isobutyryl chloride or iodide, butyric anhydride, valeric or isovaleric acid, valeroyl bromide or chloride, valeric or isovaleric anhydride, a mixture of acetyl and propionyl chloride, mixed isobutyric acid and valeric acid anhydrides, and butyric and isobutyric acids, etc. Although it is obvious that the purified phosphinylidynetrimethanol provided by the present ion exchange resin treatment is useful for making any esters or other derivatives of phosphinylidynetrimethanol, the presently provided purified phosphinylidynetrimethanol is particularly valuable because it furnished a means of making the hiterto unavailable lower trialkanoates. Hence the invention provides not only phosphinylidynetrimethanol of very high purity, but also the triacetate, tripropionate, tributyrate, triisobutyrate, trivalerate and triisovalerate, as well as the mixed esters such as the diisobutyrate valerate, divalerate isobutyrate, etc., which are obtained by reacting the purified phosphinylidynetrimethanol with an alkanoic acid of from 2 to 5 carbon atoms or the acyl halide or anhydride thereof or mixtures of the respective acids, acid halides, or acid anhydrides.

The presently provided phosphinylidynetrimethanol trialkanoates are stable, well characterized compounds. Those compounds with the same alkanoate groups are generally low-melting, colorless, crystalline to waxy materials; those in which the alkanoates are mixed are generally colorless liquids. Of this series of esters, those having the higher number of carbon atoms in the alkanoate radical can be easily supercooled to room temperature. They are generally valuable as plasticizers for synthetic resins and plastics, e.g., polyvinyl chloride, vinyl chloride-vinyl acetate copolymer, polyvinylidene chloride, polybutadiene, etc.; and in addition to rendering plasticizing effect to such polymers, they also impart flameproofing effect. When employed as plasticizers for such resins, the present trialkanoates are used in amounts of from, say, 10% to 50% by weight of the resin. The compounds possess very good thermal stability and are useful as functional fluids, e.g., as hydraulic fluids, such as in aircraft systems, or high temperature machinery, as lubricants, and as heat-transfer agents, particularly in applications subject to fire hazards.

The invention is further illustrated by, but not limited to, the following examples.

*Example 1*

This example shows the advantageous use of ion-exchange resin in preparing phosphinylidynetrimethanol.

A mixture of 114.1 g. (0.6 mole) of tetrakis (hydroxymethyl)phosphonium chloride, 69.1 g. (0.35 mole) of barium carbonate and 500 ml. of water was stirred and heated to reflux. A vigorous evolution of gas was noted, and heating at reflux was continued until evolution of gas had ceased. The whole was then cooled to room temperature and filtered to remove excess barium carbonate. The filtrate was diluted to one liter with water, and this diluted material, hereinafter referred to as diluted filtrate (1), was worked up as follows:

(A) To 200 ml. of the dilute filtrate (1) (which was calculated to contain 0.06 mole of barium chloride) there was added 5.88 g. (0.06 mole) of sulfuric acid in 100 ml. of water. The precipitated barium sulfate was filtered and washed with water. Water was removed under vacuum from the combined filtrate and washings using a rotary evaporator and a maximum bath temperature of 70° C. The dark brown viscous residue thus obtained was submitted for $P^{31}$ nuclear magnetic resonance analyses, and was found to have two phosphorus environments: chemical shifts at −56.1 p.p.m. and at −53.4 p.p.m. This shows the presence of impurity in the product.

(B) Another 200 ml. portion of the diluted filtrate (1) was passed over a 5-fold excess Amberlite IR–120 H, a commercially available, analytically pure, cation exchange resin of the sulfonated polystyrene type (see the book by G. H. Osborn, "Synthetic Ion Exchangers," N.Y., Macmillan Co., 1956, pages 15–16). This resin has an exchange capacity of 2.25 milliequivalents per millilitre of resin, and the 5-fold excess which was employed was calculated on this base with respect to the expected barium ion content of the filtrate, in order to assure removal of barium. The resulting solution, containing hydrogen chloride as a consequence of barium deionization, was then passed over an excess of the anion exchange resin, Amberlite IR–45, a commercially available, weakly basic, polyamine cross-linked polystyrene (see the book by Nachod et al., "Ion Exchange Technology," N.Y., Academic Press, 1956, page 25). The effluent was then evaporated in vacuum, using a rotary evaporator, to give as residue the purified phosphinylidynetrimethanol. $P^{31}$ nuclear magnetic resonance analysis of this oil showed only one phosphorus environment: a chemical shift at −50.4 p.p.m.

(C) In order to ascertain whether treatment with both the cation and anion exchange resins was required to give a pure product, still another 200 ml. portion of the diluted filtrate (1) was submitted to only the cation Amberlite IR–120 H treatment described in (B) above, and then instead of following with anion exchange resin treatment, water and hydrochloric acid were removed by vacuum evaporation. The brown viscous residue thus obtained showed two peaks by $P^{31}$ nuclear magnetic resonance analysis: $\alpha A = -55.6$ p.p.m. and $\alpha B = 52.9$ p.p.m.

As shown in Example 4, treatment with cation exchange resin may be replaced by removal of barium as sulfate. But the anion treatment is necessary.

*Example 2*

This example shows difficulties encountered in preparing phosphinylidynetrimethanol triacetate from a phosphinylidynetrimethanol which has not been subjected to deionization, and the successful preparation of the triacetate through the tribenzoate which is easily obtained from crude phosphinylidynetrimethanol.

A mixture of 228.2 g. (1.2 mole) of tetrakis(hydroxymethyl)phosphonium chloride, 138.2 g. (0.70 mole) of barium carbonate and 1 liter of water was stirred and heated at reflux until evolution of gas was no longer noted (about 19 hours). After cooling to room temperature, the excess barium carbonate was filtered off. One-half of the filtrate was treated with 0.3 mole of sulfuric acid in 150 ml. of water. The resulting barium sulfate was removed by centrifuging, and the precipitate was washed with water. Distillation of the combined aqueous phase and washings to 70° C./20 mm. gave a brown, viscous oil as residue. This was the crude phosphinylidynetrimethanol. It was transferred to another vessel and treated, with stirring, with 409 g. (4 moles) of acetic anhydride. The oil did not dissolve; so 50 ml. of acetic acid and 0.5 ml. of pyridine were added and the whole was gradually heated to 75° C. At this point an exothermic reaction occurred and the temperature rose rapidly to a maximum of 95° C. After the exothermic reaction had subsided, the reaction mixture was maintained at about 80° C. for 2 more hours by external heating. It was then allowed to cool to room temperature, filtered, and the filtrate distilled under reduced pressure to remove acetic acid and unreacted acetic anhydride. Distillation of the residue gave 71.9 g. of a fraction, B.P. 174–184° C./0.25–05 mm. and a large amount of black, very viscous residue. The fraction was redistilled to give the following:

(1) 4.15 g., B.P. 165–168° C./0.15 mm., $n_D^{25}$ 1.4792
(2) 16.83 g., B.P. 168–170° C./0.15 mm., $n_D^{25}$ 1.4751
(3) 41.4 g., B.P. 170–173° C./0.15 mm., $n_D^{25}$ 1.4695
(4) 4.76 g., B.P. 173° C./0.15 mm., $n_D^{25}$ 1.4685

Fractions 1 and 4 were submitted for infrared, vapor-phase chromatography, and nuclear magnetic resonance analyses. The infrared spectra of both fractions were found to be similar, both of them containing the C=O bond at 1752 cm.$^{-1}$ and the P=O bond at 1058 cm.$^{-1}$. Nuclear magnetic resonance $P^{31}$ analyses showed fraction (1) to have four phosphorus environments: there were chemical shifts at −37.2 p.p.m., −33.6 p.p.m., −15.9 p.p.m. and −14.4 p.p.m.; and fraction (4) was shown to have only the one phosphorus environment: a chemical shift at −32.8 p.p.m. Vapor phase chromatography confirmed these findings, fraction (1) appearing to consist of at least 3 components, and fraction (4) having one major peak. Since fraction (4) represented only a very low yield of homogenous material and because it differed considerably from the preceding fraction (3) in refractive index, fractions (1) through (4) were combined and refractionated at greater vacuum. This time the following were obtained.

(a) 2.55 g., B.P. 168–169° C./0.1 mm., $n_D^{25}$ 1.4750
(b) 5.41 g., B.P. 168–170° C./0.1 mm., $n_D^{25}$ 1.4741

(c) 18.81 g., B.P. 170–172° C./0.1 mm., $n_D^{25}$ 1.4728
(d) 16.08 g., B.P. 172° C./0.1 mm., $n_D^{25}$ 1.4690

All of the fractions (a) through (d) were colorless liquids, and since the refractive index of (d) was intermediate to (3) and (4) of the first fractionation, (d) was not considered to be as homogeneous as was fraction (4). It will be noted however, that (4) had been obtained in only a very low yield. By working with a phosphinylidynetrimethanol which had been treated with ion exchange resin, an approximately 60% theoretical yield is obtained, as shown in Example 5 which shows preparation of the acetate from the purified material.

*Example 3*

This example shows preparation of phosphinylidynetrimethanol triacetate by proceeding through the tribenzoate. The following procedure was used: Tetrakis(hydroxymethyl)phosphonium chloride was refluxed in water and with barium carbonate, and the barium was removed as sulfate, substantially as described by A. Hoffman, J. Amer. Chem. Soc. 52 2995 (1930). A solution of 0.6 mole of the resulting phosphinylidynetrimethanol in about 600 ml. of water was stirred and cooled in an ice bath to 5° C., after which 600 ml. of 20% aqueous sodium hydroxide solution and 253.2 g. (1.8 mole) of benzoyl chloride were added simultaneously at such rate that the temperature did not exceed 15° C. The white solid precipitate was washed with water and dried. Two recrystallizations from methanol gave 139.8 g. (51.5% theoretical yield) of phosphinylidynetrimethanol tribenzoate, colorless needles, M.P. 111–112° C., showing by $P^{31}$ nuclear magnetic resonance analysis a single chemical shift at −36.0 p.p.m.

The tribenzoate was converted to the free trialkanol as follows: A mixture of 45.2 g. (0.1 mole) of the tribenzoate, 198 g. (6.2 mole) of absolute methanol and 0.1 g. of p-toluenesulfonic acid monohydrate was refluxed for 22 hours, then was cooled to room temperature, and 1 g. of anhydrous potassium carbonate was added. Excess methanol was removed under reduced pressure, leaving two liquid layers. The upper layer (methyl benzoate) was decanted, and the lower layer was washed with ether and then heated for 3 hours at 80° C./20 mm. to remove the ether. The viscous oil which remained was phosphinylidynetrimethanol and was found by $P^{31}$ nuclear magnetic resonance analysis to contain only one phosphorus environment (chemical shift at −49.1 p.p.m.).

The triacetate was prepared as follows: To a portion of this phosphinylidynetrimethanol was added excess acetic anhydride, and the mixture was allowed to stand for 2 days at room temperature. It was then heated with stirring to 80–90° C. for 3 hours. The acetic acid and excess acetic anhydride were removed under reduced pressure, and the residue was filtered and distilled to give a fraction, B.P. 189–207° C./0.43–0.75 mm. which crystallized upon standing. Recrystallization to constant melting point from benzene-hexane gave the phosphinylidynetrimethanol triacetate, M.P. 68–69° C. and analyzing as follows:

| Percent | Found | Calc'd for $C_9H_{15}O_7P$ |
| --- | --- | --- |
| C | 40.61 | 40.61 |
| H | 5.58 | 5.68 |
| P | 11.61 | 11.64 |

Nuclear magnetic resonance spectra showed a single phosphorus environment with a chemical shift at −34.4 p.p.m. The infrared spectrum had a strong carbonyl bond at 1745 cm.$^{-1}$.

The autogenous ignition temperature of the triacetate, measured by ASTM D–60T procedure, and adhering to the detailed directions given by M. G. Zabetakis et al. in "Industrial and Engineering Chemistry" 46 2173 (1954), was found to be 660° F. for 0.15 ml. after a time lag of 12 seconds.

*Example 4*

A mixture consisting of 476 g. (2.5 moles) of tetrakis(hydroxymethyl)phosphonium chloride, 276 g. (1.4 moles) of barium carbonate and 1500 ml. of water was refluxed for 26 hours. At this point, gas was still being evolved; and the reaction mixture was allowed to stand at room temperature for several days. Excess barium carbonate was then filtered off, and the filtrate was treated with a solution of 122.6 g. (1.25 moles) of sulfuric acid in 300 ml. of water in order to precipitate barium sulfate. It was then filtered through a 1″ pad of Filter Cel, and the resulting clear filtrate was concentrated under vacuum to a pot temperature of 55° C./15 mm. The dark brown viscous oil which was thus obtained as residue was diluted with about 300 ml. of water, and Amberlite IR–45 (OH), (a weakly basic amino polystyrene anion exchange resin) was added in portions until the mixture showed a pH 6 by alkacid test paper. The resin was then filtered off, water was removed from the filtrate under vacuum, and the residue was finally concentrated in a rotary evaporator at 75–80° C./0.2 mm. for 3 hours. There was thus obtained 318 g. of the substantially pure phosphinylidynetrimethanol, a brown-orange, viscous oil. $P^{31}$ nuclear magnetic resonance gave a single peak, αA=−49.2 p.p.m.

*Example 5*

This example shows conversion of the phosphinylidynetrimethanol of Example 4 into the triacetate.

A mixture consisting of 192 g. (1.37 mole) of said phosphinylidynetrimethanol, 837 g. (8.2 moles) of acetic anhydride and 1 ml. of pyridine was gently heated, with stirring, to a temperature of 45° C. At this point an exothermic reaction occurred which carried the temperature to 118° C. within about 15 minutes. When the exothermic reaction had subsided, the reaction mixture was held at 100–105° C. for two hours. After distilling off the by-product acetic acid and acetic anhydride under water pump pressure, a dark brown oil was obtained as the residue. It was distilled under vacuum to give 292 g. of pale yellow distillate, B.P. 194–204° C./0.35–0.55 mm. Twice repeated distillation and crystallization from benzene-hexane gave 220.6 g. (60.4% theoretical yield) of the substantially pure phosphinylidynetrimethanol triacetate, white crystals, M.P. 67–68.5° C.

In another run, 70 g. (0.5 mole) of the same phosphinylidynetrimethanol, i.e., that prepared in Example 4, was stirred with 306 g. (3 moles) of acetic anhydride and 0.5 ml. of pyridine while slowly increasing the temperature to 75° C. Exothermic reaction then carried the temperature to 130° C., at which point ice-bath cooling was applied. The mixture was then held at 100–110° C. for 1.5 hours. At the end of that time, acetic acid and excess acetic anhydride were removed under reduced pressure, leaving a dark brown oil which solidified upon cooling. It was crystallized from benzene-hexane to give 116.2 g. of brown crystals. This crystalline material was then subjected twice to a distillation followed by benzene-hexane recrystallization to give 69.6 g. (52.3% theoretical yield), of highly pure phosphinylidynetrimethanol triacetate, colorless crystals, M.P. 68–69° C.

*Example 6*

This example shows preparation of phosphinylidyne triisobutyrate from a phosphinylidynetrimethanol which had been treated with ion-exchange resin.

Operating substantially as in Example 1 (B), a 400 ml. portion of the diluted filtrate (1) of that example (said portion calculated to contain 0.24 mole of $(HOCH_2)_3PO$ and 0.12 mole of $BaCl_2$) was passed through an excess of the cation exchange resin Amberlite IR-120 H to remove barium. The effluent solution was then passed through Amberlite IR A-400 (OH) (an analytical grade of a strongly basic anion exchange resin of the polystyrene quaternary amine type, G. H. Osborn, loc. cit., page 18) to remove the hydrochloric acid and then because the effluent was on the basic side, it was again passed over Amberlite IR-120 H. Water was then removed in a vacuum rotary evaporator at a maximum bath temperature of 60° C. to give as residue the nearly colorless, viscous phosphinylidynetrimethanol.

Esterification was conducted as follows: To 26.2 g. (0.187 mole) of the phosphinylidynetrimethanol there was added 70 ml. of pyridine, and the resulting mixture was stirred vigorously and cooled in an ice-water bath to 5° C. Then 62.8 g. (0.589 mole) of isobutyryl chloride was added dropwise at such a rate that the temperature did not exceed 10° C. A pale yellow precipitate formed during the addition. The whole was then allowed to attain room temperature and stirred overnight. It was then poured into ice-water. The tan oil which separated was taken up in 200 ml. of ether, and the aqueous phase was extracted with four 100 ml. portions of ether. The combined ether solutions were washed, first with saturated aqueous sodium bicarbonate and then with water, and the washed material was dried over magnesium sulfate. Distillation of the dried material gave a fraction, B.P. 175–180° C./0.09–0.1 mm., which upon repeated distillation gave the substantially pure, colorless, phosphinylidynetrimethanol triisobutyrate, B.P. 166–167° C./0.06 mm., M.P. about 30° C., and analyzing as follows:

| Percent | Found | Calc'd for $C_{15}H_{27}O_7P$ |
|---|---|---|
| C | 51.54 | 51.42 |
| H | 7.56 | 7.77 |
| P | 8.91 | 8.84 |

$P^{31}$ nuclear magnetic resonance analysis showed a single phosphorous environment, a chemical shift at −33.7 p.p.m., consistent with the $$[(CH_3)_2CHCO_2CH_2]_3P=O$$

structure. Infrared analysis gave a strong C=O peak at about 1745 cm.$^{-1}$.

The autogenous ignition temperature of the triisobutyrate, determined as in Example 3, was found to be 685° F. for 0.07 ml. at a time lag of 12 seconds.

Operating as above, phosphinylidynetrimethanol tripropionate is obtained by replacing the isobutyryl chloride with propionyl chloride.

As shown in Example 4, treatment with cation exchange resin may be dispensed with when only the substantially stoichiometric quantity of sulfuric acid has been used for precipitation of the barium, and the repeated treatment with cation resin, as in Example 6 is conducted only to mitigate the pH increase which resulted from the use of a strongly basic cation resin for removal of hydrochloric acid.

As is evident from the above, the process herein described permits various procedural modifications with respect to conversion of tris(hydroxymethyl)phosphonium halide to phosphinylidynetrimethanol and conversion of the latter to the trialkanoates since the salient features of this invention are treatment with ion-exchange resin of any crude phosphinylidynetrimethanol for the purpose of removing ionized impurities therefrom, and the provision of the lower trialkanoates from the resin-treated trialkanol. The invention has been disclosed with respect to certain preferred embodiments and various modifications and variations thereof will become obvious to persons skilled in the art and are intended to be included within the spirit and scope of this invention.

What we claim is:

1. The process of treating the crude reaction mixture obtained by hydrolysis of tetrakis(hydroxymethyl)phosphonium chloride with aqueous inorganic base which comprises removing any insoluble solids, treating the residue with both a cation exchange resin and an anion exchange resin, and removing water from the treated residue to obtain phosphinylidynetrimethanol of such purity that only a single chemical shift is produced by $P^{31}$ nuclear magnetic resonance analysis.

2. The process defined in claim 1, further limited in that the inorganic base is barium carbonate.

References Cited by the Examiner

UNITED STATES PATENTS 3,082,256  3/1963  Harwood _____ 260—60.65

OTHER REFERENCES

Hoffman: J.A.C.S., vol. 43, pp. 1684–8 (1921).
Hoffman: J.A.C.S., vol. 52, pp. 2995–3000 (1930).
Houston: J.A.S.C., vol. 68, pp. 914–920 (1946).
Nachod: Ion Exchange Technology, pp. 554–60 (1956)

TOBIAS E. LEVOW, *Primary Examiner.*

LEON ZITVER, LORRAINE A. WEINBERGER,
*Examiners.*

UNITED STATES PATENT OFFICE
CERTIFICATE OF CORRECTION

Patent No. 3,242,217                                    March 22, 1966

William C. Hammann et al.

It is hereby certified that error appears in the above numbered patent requiring correction and that the said Letters Patent should read as corrected below.

Column 1, lines 25 to 29, the lower bottom portion of the formula should appear as shown below instead of as in the patent:

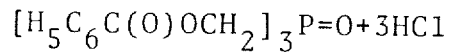

$$[H_5C_6C(O)OCH_2]_3P=O + 3HCl$$

column 3, line 57, for "phosphen-" read -- phosphin- --; column 4, line 9, for "and" read -- an --; line 34, for "many" read -- may --; column 6, line 47, for "05 mm." read -- 0.5 mm. --.

Signed and sealed this 26th day of September 1967.

(SEAL)
Attest:

ERNEST W. SWIDER                              EDWARD J. BRENNER
Attesting Officer                           Commissioner of Patents